United States Patent [19]
Potter

[11] Patent Number: 5,522,707
[45] Date of Patent: Jun. 4, 1996

[54] VARIABLE FREQUENCY DRIVE SYSTEM FOR FLUID DELIVERY SYSTEM

[75] Inventor: Richard W. Potter, Winfield, Ill.

[73] Assignee: Metropolitan Industries, Inc., Romeoville, Ill.

[21] Appl. No.: 340,531

[22] Filed: Nov. 16, 1994

[51] Int. Cl.⁶ .................................................. F04B 41/06
[52] U.S. Cl. .............................. 417/4; 417/44.2; 417/53
[58] Field of Search .................... 417/4–6, 44.2, 417/17, 31, 32, 53, 63

[56] References Cited

U.S. PATENT DOCUMENTS

| | | | |
|---|---|---|---|
| 3,005,411 | 10/1961 | Metz | 417/6 |
| 3,511,579 | 5/1970 | Gray et al. | 417/6 |
| 3,844,683 | 10/1974 | Albert | 417/6 |
| 4,290,735 | 9/1981 | Sulko | 417/6 |
| 5,259,731 | 11/1993 | Dhindsa et al. | 417/6 |

FOREIGN PATENT DOCUMENTS

| | | | |
|---|---|---|---|
| 0130501 | 11/1978 | Japan | 417/5 |
| 0123386 | 9/1980 | Japan | 417/5 |
| 403194195A | 8/1991 | Japan | 417/6 |

OTHER PUBLICATIONS

Brochure entitled "720 Pressure Reducing Valve" dated Jul., 1983.

*Primary Examiner*—Richard A. Bertsch
*Assistant Examiner*—Xuan M. Thai
*Attorney, Agent, or Firm*—Dressler, Goldsmith, Shore & Milnamow, Ltd.

[57] ABSTRACT

A fluid flow delivery system switches a variable speed pump drive among a plurality of pumps. The remaining pumps can be operated as constant speed pumps and can be energized one at a time in response to increasing demand. The pump associated with the variable speed drive can be operated over a variable output range to provide relatively low levels of fluid output, in response to low demand, and can be operated in combination with one or more constant speed pumps to provide increased levels of output fluid in response to greater demand levels.

14 Claims, 6 Drawing Sheets

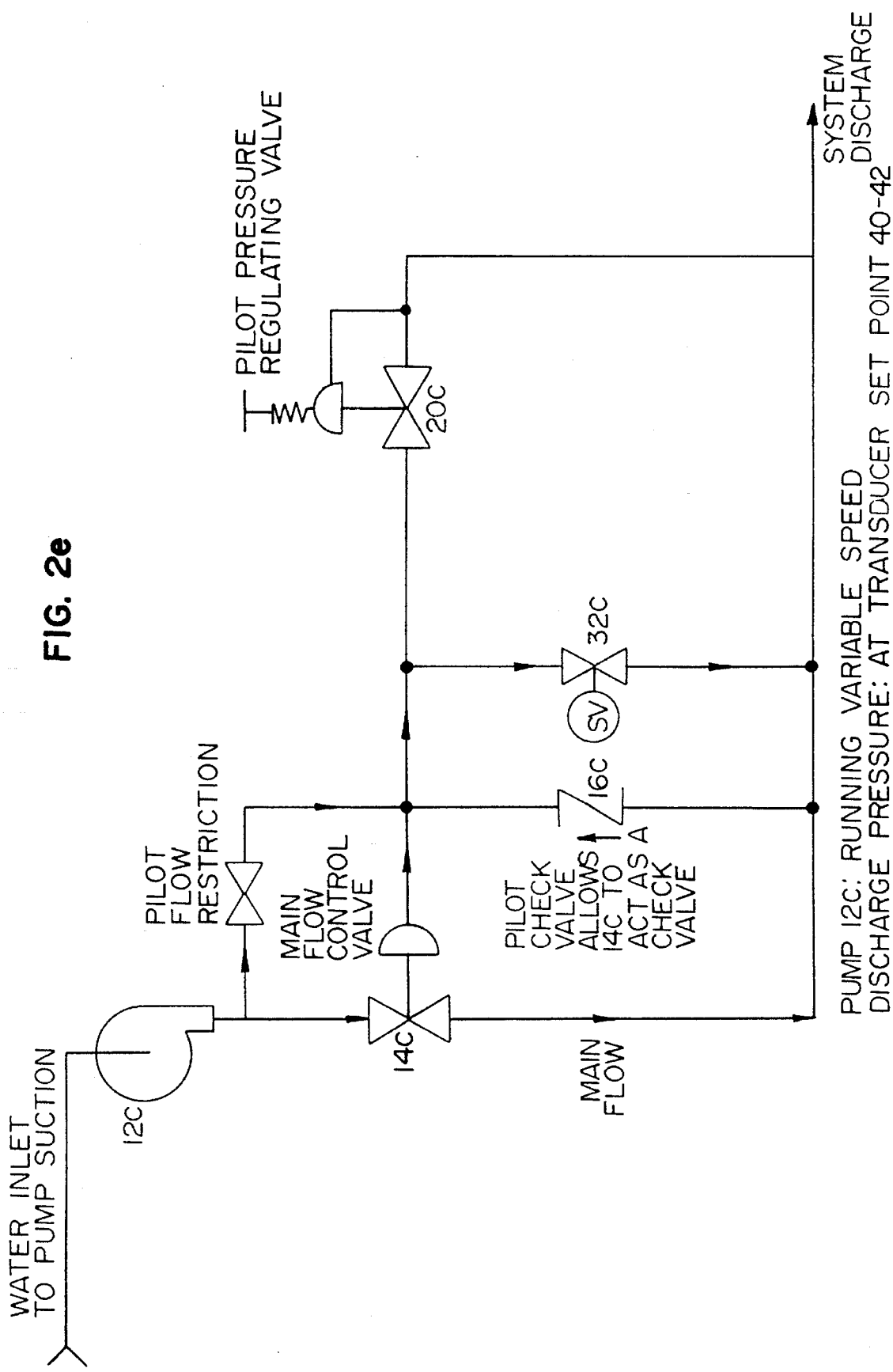

VARIABLE FREQUENCY DRIVE SYSTEM FOR FLUID DELIVERY SYSTEM

FIELD OF THE INVENTION

The invention pertains to fluid flow delivery systems. More particularly, the invention pertains to constant pressure delivery systems wherein the delivered pressure is different than the received pressure of the fluid.

BACKGROUND OF THE INVENTION

Fluid flow delivery systems which incorporate constant speed pumps are known. Such pump systems have the advantage that constant speed pumps tend to be less expensive than variable speed pump systems. On the other hand, constant speed pump systems have higher operating costs due among other reasons to utility and maintenance expenses resulting from constant operation. Additionally, there is a need to bypass or choke the discharge flow of the pumps in low demand situations. Such structures however waste energy and create unwanted heat.

Variable speed pump systems offer higher operating flexibility than do constant speed pump systems. However, known variable speed systems tend to be more expensive than known constant speed systems.

It would be desirable to be able to merge a variable speed drive with pumps that can be operated on either a constant or a variable speed basis so as to obtain the benefits of both types of systems. Preferably such a merger could be accomplished while at the same time minimizing the effects of the disadvantages of either type. It would be preferable to be able to combine the variable speed drive with constant speed pumps in a transparent fashion so as to cost effectively provide constant output pressure in response to widely varying demands.

SUMMARY OF THE INVENTION

A control system capable of switching a variable speed drive among the members of a plurality of pumps makes it possible to obtain benefits of both constant speed and variable speed drive systems. In addition to being usable with the variable speed drive when selected, each of the pumps is capable of being operated at a substantially constant speed to provide a predetermined output pressure. This output pressure is established by a respective local feedback loop which is coupled to the respective pump.

The control system includes a control unit which could incorporate a programmable processor. A first group of relays or other switching elements is provided which are coupled to the control unit. The relays or switching elements are couplable to respective members of the plurality of pumps and can be operated to provide electrical energy to cause each of the respective pumps to function at a substantially constant speed.

A second plurality of relays or switching elements is provided which is coupled to the control unit. These relays or switching elements are coupled to a variable speed drive system. The members of a second plurality of relays or switching elements are also couplable to respective ones of the pumps.

Since each of the pumps includes a respective local feedback loop, a plurality of feedback loop disabling control devices is incorporated. The members of the plurality are coupled to the control unit and are coupled to respective members of the plurality of feedback loops.

The control unit includes circuitry, responsive to demand, for selecting a pump from the plurality and for enabling a respective one of the feedback loop disabling control devices so as to disable the respective feedback loop of the selected pump. The variable speed drive is then coupled to the selected pump using respective members of the second plurality of relays or switching elements.

The selected pump can then be operated at variable speeds in accordance with demand and the output operates on a feedback loop independent of the constant speed pressure feedback loop (typically hydraulic) of the variable speed drive system. The remaining members of the plurality of pumps are capable of functioning in a normal fashion at a substantially constant speed and can be brought on-line as demand increases.

In one aspect of the invention, the control unit is able to switch the variable speed drive system among the various pump motors. In this mode of operation, one pump may be selected to be driven by the variable speed drive for a predetermined period of time while the others are operated at constant speed. Subsequently, the variable speed drive can be coupled to a different pump and the remainder of the pumps can again be operated at a constant speed.

These and other aspects and attributes of the present invention will be discussed with reference to the following drawings and accompanying specification.

BRIEF DESCRIPTION OF THE DRAWING

FIGS. 2a–2e are flow diagrams illustrating control of fluid flow in accordance with the present invention.

DETAILED DESCRIPTION

Figure 1:
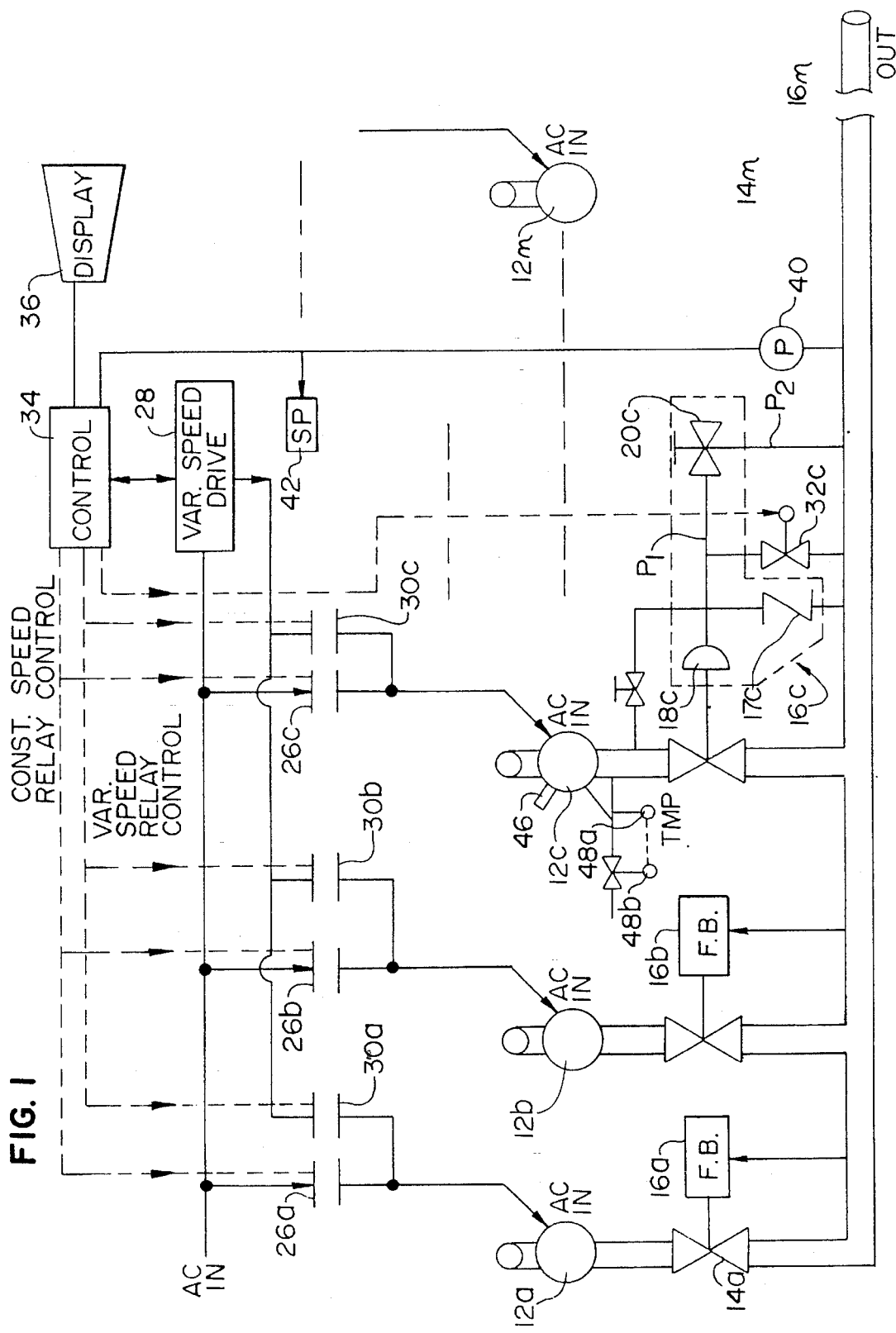
FIG. 1 is a block diagram of schematic illustrating elements of a combined constant speed/variable speed drive system in accordance with the present invention.

While this invention is susceptible of embodiment in many different forms, there is shown in the drawing, and will be described herein in detail, specific embodiments thereof with the understanding that the present disclosure is to be considered as an exemplification of the principles of the invention and is not intended to limit the invention to the specific embodiments illustrated.

A combined variable speed/constant speed pump system 10 configured as a constant output pressure system is illustrated in FIG. 1. The system 10 includes a plurality of pumps 12a, 12b . . . 12n. Each of the pumps is a conventional unit which is driven by an electric motor. The electric motor, for example, might be a standard type of AC squirrel cage induction motor.

Such pumps can be conventionally driven using 220–440 volt AC electrical energy as supplied by an electrical utility. An exemplary type of pump which would be suitable for use with the system 10 is a centrifugal single stage or multi-stage water pump.

Each of the pumps 12a, 12b . . . 12n has an input port coupled to an input fluid flow conduit (not illustrated). Each flow conduit is coupled to a source or reservoir of fluid to be delivered.

Each of the pumps, such as the pump 12c is coupled to and controlled by a pressure reducing valve, such as the valve 14c, of a conventional type under constant speed operation. For example, one exemplary valve is a model 720 pressure reducing valve marketed by Bermad.

One such valve 14a, 14b ... 14n is associated with each of the pumps. With respect to exemplary valve, such as 14c, each of the valves includes a local feedback loop 16c, of a known variety. The valve 14c, in combination with the local feedback loop 16c when coupled to the pump 12c can provide a constant, preset, downstream pressure at varying flow volumes.

The local feedback loop 16c includes a pilot check valve 17c and control bonnet 18c in combination with a manually adjustable local pilot pressure regulating valve 20c. In normal constant speed operation the feedback loop 16c balances pressures $P_1$ and $P_2$ on each side of the regulating valve 20c and provides control pressure input to the valve. As pressure $P_2$ drops due to demand, the control pressure $P_1$ also drops resulting in the valve opening in a known fashion so as to maintain output pressure.

The pumps can be energized for constant speed operation directly off of AC voltage supply line 24 by a plurality of relays, such as the relays 26a, 26b, 26c ... 26n. When the contacts of the corresponding relay, such as the relay 26c are closed, AC electrical energy from the line 24 is applied to the respective pump, such as the pump 12c, which then operates in its constant speed mode in combination with its respective control valve 14c.

The system 10 also includes a variable speed drive 28 which is coupled to the AC supply line 24 and couplable to the members of the plurality of pumps 12 via a plurality of relays or switching elements 30a, 30b, 30c ... 30n. When a respective relay, such as the relay 30c is energized, and when the relay 26c is not energized, the variable speed drive 28 is coupled to the motor for the pump 12c and can operate that selected pump in a variable speed mode.

By selectively energizing appropriate variable speed drive related relays, the variable speed drive 28 can be coupled in turn to each of the pumps 12a, 12b ... 12n. The coupled pump can be operated in a variable speed mode. The remaining pumps can be operated as needed in a constant speed mode.

In combination with the associated variable speed drive relay element, such as the element 30c, a solenoid actuated by-pass valve such as the exemplary valve 32c is provided in each of the respective local control loops 16a, 16b, 16c ... 16n. The solenoid actuated by-pass valve is used to disable the local feedback loop, such as the loop 16c, when the respective pump, such as the pump 12c, is selected for variable speed operation. Hence, a plurality of solenoid actuated by-pass valves 32a, 32b, 32c ... 32n of which 32c is exemplary, is provided one associated with each of the respective local feedback loops 16a, 16b, 16c ... 16n.

The system 10 is controlled in an overall fashion by a control unit 34. The control unit 34 can include a programmable microcomputer for example, along with an associated, optional, graphical display 36.

In addition, output pressure feedback is provided to both the variable speed drive 28 and the control unit 34 by a pressure transducer 40. If desired, a manually adjustable set point element 42 can be provided in the variable speed drive feedback loop.

The control unit 34 can, in a preferred form of the invention, select one of the pumps 12a, 12b, 12c ... 12n as the variable speed pump. The selected pump will be driven by the variable speed drive 28 while the remaining pumps can be operated in a constant speed mode and switched on or off as necessary in response to demand sensed by the control unit 34 via the transducer 40.

The pump, such as the pump 12c, which has been selected by the control unit 34 to be coupled to the variable speed drive 28 is always on-line and provides flow from zero PSI to its maximum rated pressure. In a preferred mode of operating, the pump 12c, driven by the variable speed drive 28, is set to provide a slightly lower pressure than the constant speed pumps are capable of providing. As demand increases, the output of the variable speed drive 28 increases, causing the output of the coupled pump, for example, 12c, to increase to a maximum.

When the output of the pump 12c increases to a maximum, the control unit 34 energizes one of the constant speed pumps and simultaneously reduces output from the pump 12c to zero until demand increases further. Upon detecting sufficient demand, additional constant speed pumps can be brought on-line to maintain output flow at the designated pressure.

Automatic pressure relief can also be provided by one or more pressure relay ports 46 in instances where a check valve is provided, in accordance with local codes, on the input side of the pump. Such pressure relief ports make it possible to minimize pump damage by limiting pressure buildup within the pump.

Additionally, a temperature control system 48 can be provided for each of the pumps, such as the exemplary pump 12c. The system 48 includes a temperature sensor 48a coupled to a solenoid actuated valve 48b.

The temperature sensor 48a is intended to detect excessive temperature in the output fluid from the pump 12c. In the response to the detected temperature, the respective solenoid or mechanically actuated valve 48b can be energized to provide a drain from the pump and thereby cool the pump housing with cooler input fluid. Value 48b may also be located downstream of the valve 14c and may discharge to pump suction, causing recirculation or to waste.

The high temperature thermostat switch sensing bulb 48a is located in a pipe connected between the pump discharge and a pump case tap located in a lower pressure zone. Circulation of pump case water exposes the thermostat 48a to the pump internal water temperature. When the thermostat switch operates, the electric solenoid valve, such as 48b, opens to purge the pump case with lower temperature water.

An alternate scheme is to use a thermal expansion bulb which acts through a capillary to operate a mechanical valve to either waste pumped water to a drain, or to cause recirculation of water at some expanse of system piping in order to distribute and dissipate heat. An electric solenoid valve may also recirculate water as previously stated.

Additionally, in applications where both suction check valves and discharge pressure relief valves are used, a mechanically operated over temperature/over pressure valve is piped to the pump case so as to cause flow out of the pump in either condition.

The system 10 can be used for commercial buildings, office buildings, high-rise complexes as well as stadiums. It incorporates the variable speed electrical drive 28 to improve efficiency on initial demand and uses more efficient constant speed pumps to respond to a higher demand. The system 10 thus advantageously combines the cost benefits of constant speed pump systems with the advantage achievable with variable speed drive systems.

The system 10 can be used not only in pressure reducing systems, but also pressure boosting systems. The system 10 is usable with fresh water, gray water, storm sewer runoff, sewage or other fluids.

By way of contrast with the present inventive structure, prior art valve bonnet pressure is controlled to produce a specific main valve downstream pressure. A pressure controlled pilot valve is introduced between the inlet or upstream side of the main valve, and the downstream side, or outlet of the main valve. The pilot valve balances the movement of a diaphragm, one side of which is connected to the downstream pressure of the main valve, and between a spring and atmospheric pressure. Main valve upstream pressure is connected to the main valve control bonnet through a flow restricting orifice. The pilot valve is connected between the main valve bonnet and the main valve downstream or outlet.

Figure 2A:
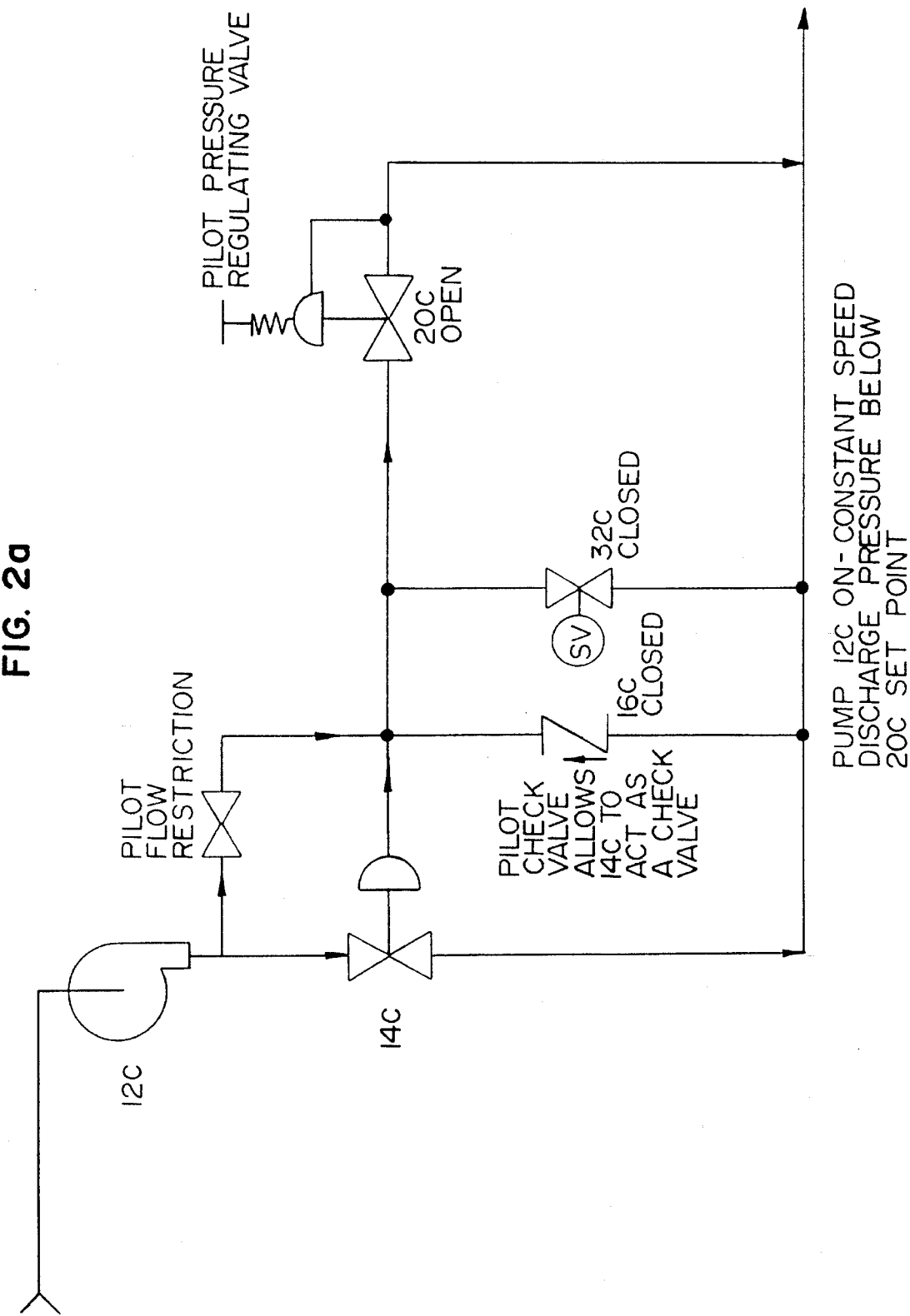

FIG. 2a illustrates fluid flow in a condition with pump 12c energized for contrast speed with discharge pressure below that set at the pilot pressure valve 20c. The pilot valve 20c responds to a main valve outlet pressure that is low by allowing flow from the main valve bonnet through to the main valve discharge.

The pressure in the main valve control bonnet drops because the flow from the inlet or upstream side of the main valve is flow restricted. The main valve 14c is thus allowed to open by the force applied to the main valve disk by the inlet upstream pressure.

Figure 2B:
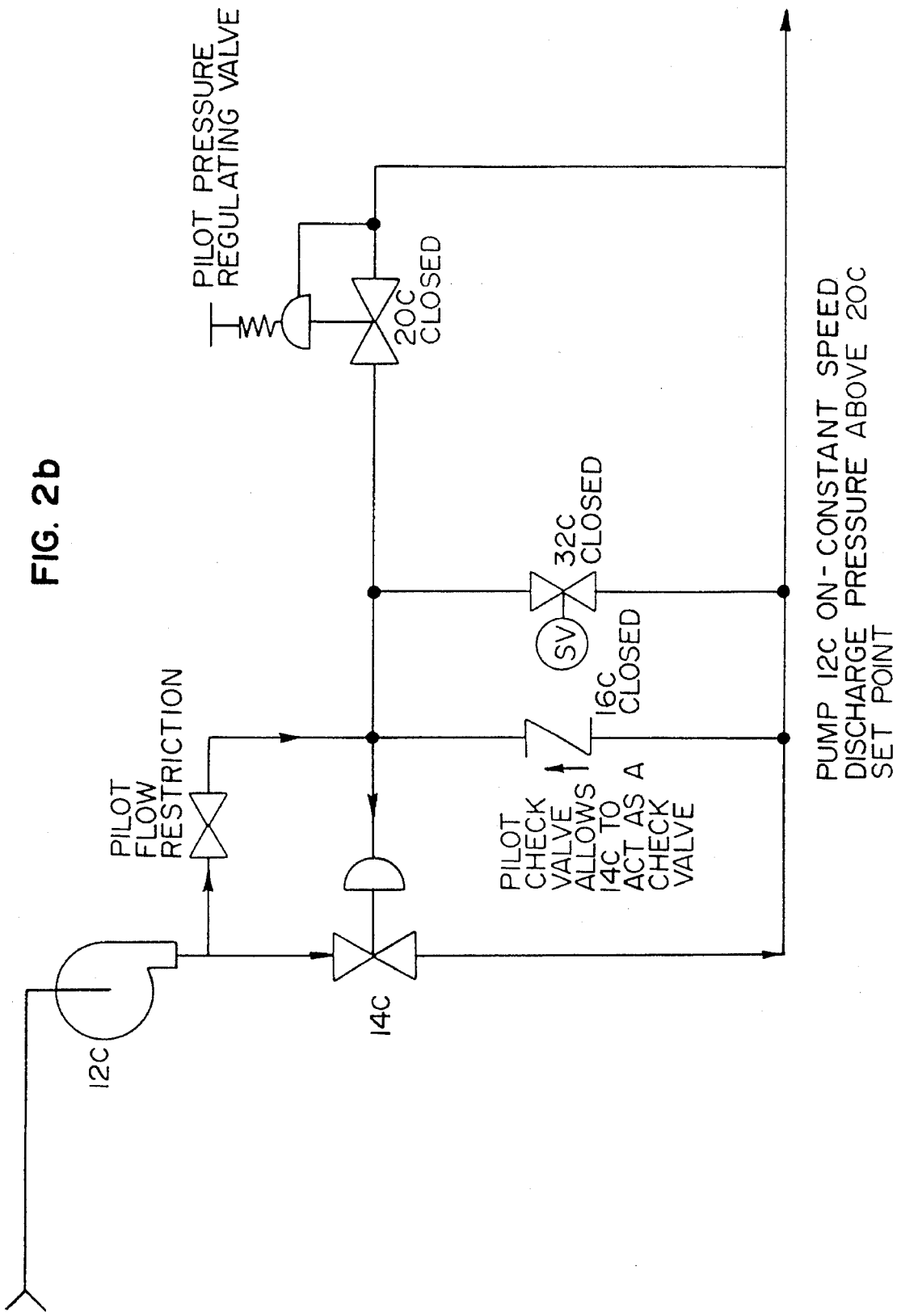

FIG. 2b illustrates fluid flow in a condition with pump 12c energized for constant speed with discharge pressure above that set at the pilot pressure valve 20c. The pilot valve 20c responds to a main valve outlet pressure that is high by closing. This allows main valve inlet pressure to be applied through the restricting orifice to the control bonnet 18c of the main valve 14c, closing it.

Figure 2C:
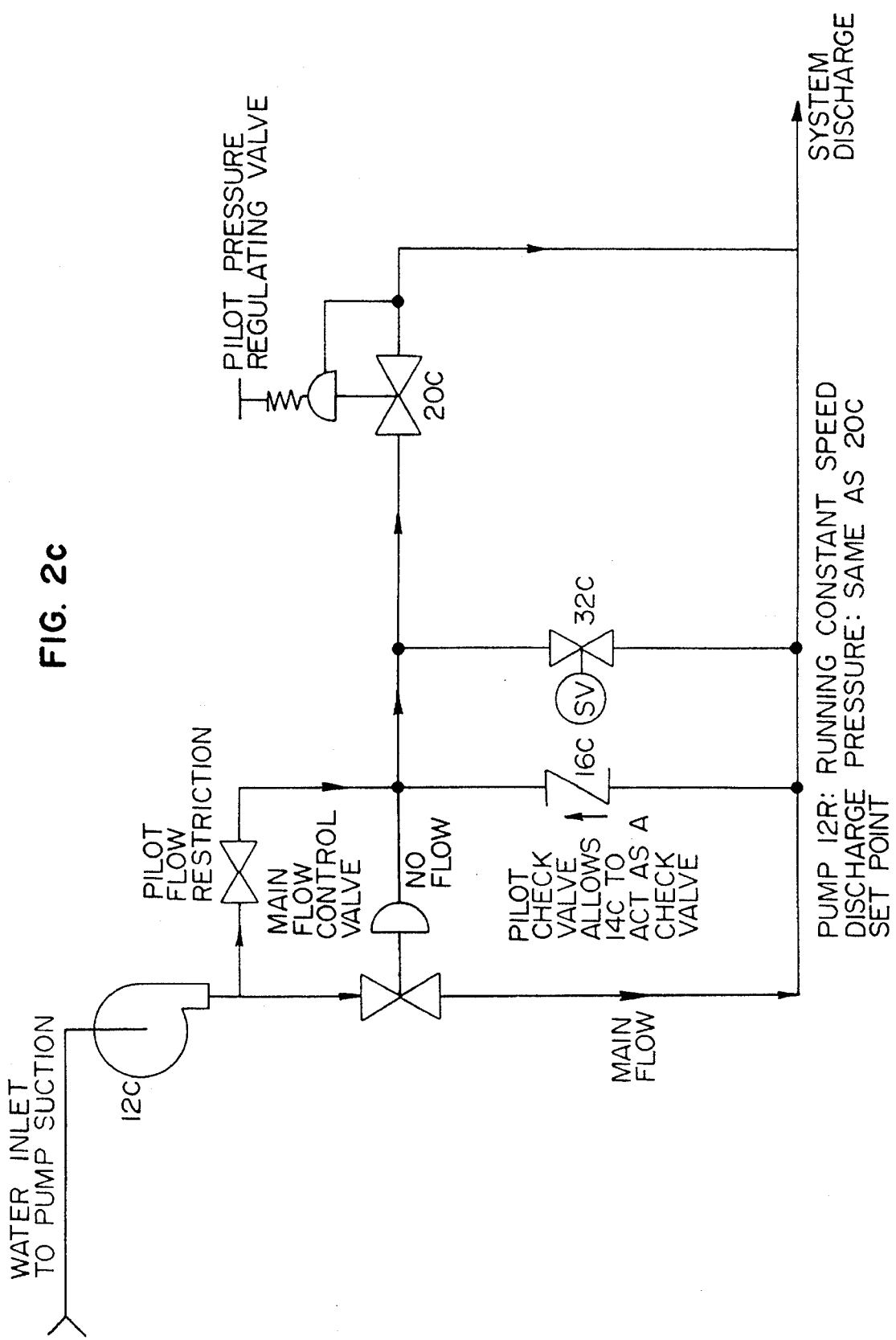

FIG. 2c illustrates fluid flow in a condition with pump 12c energized for constant speed operation with discharge pressure the same as that set at pilot pressure valve 20c. Intermediate main valve position is achieved when a balance is obtained between the pilot valve flow and the supply flow through the restricting orifice producing a pressure in the main valve control bonnet 18c that positions the control piston and main flow control disk so as to produce a downstream main valve pressure that balances the pilot valve spring maintaining desired main valve downstream pressure.

Figure 2D:
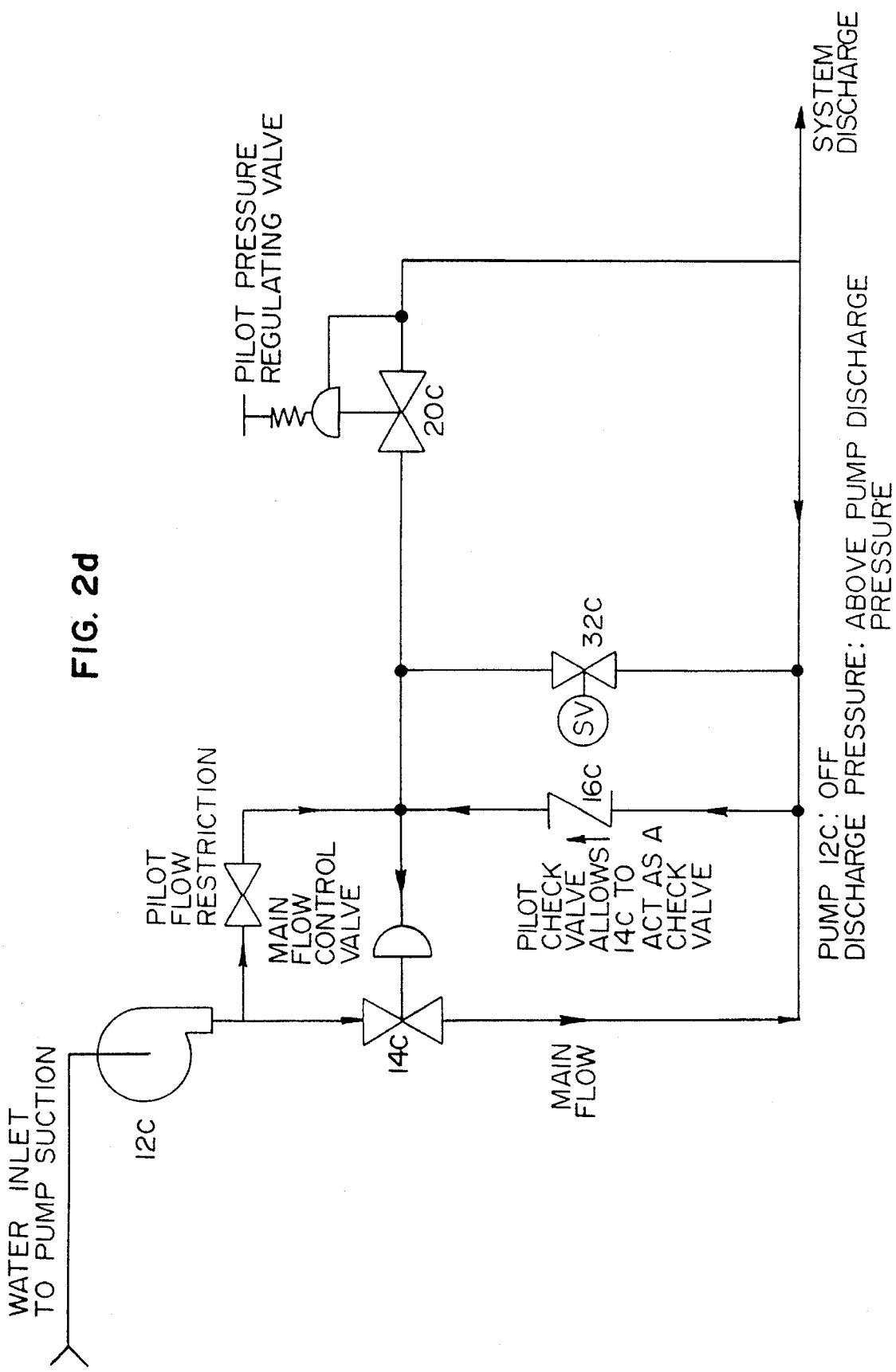

FIG. 2d illustrates fluid flow when pump 12c is turned off. In this instance, the discharge pressure exceeds present discharge pressure for pump 12c. The main valve outlet is connected through a pilot check valve 16c to the main valve control bonnet 18c. When the downstream pressure is greater than the upstream pressure, water flows into the bonnet from the main valve downstream side causing the main valve 14c to close. This function will take place whenever the downstream pressure exceeds the upstream pressure. This action prevents back flow of water through the main valve 14c.

FIG. 2e illustrates fluid flow when pump 12c is being energized for variable speed operation by drive 28. In this instance, pilot valve 40 overrides main valve pressure control. Pilot control of main valve downstream pressure may be overridden by operation of an additional valve 32c that connects the main valve control bonnet 18c to the downstream side of the main valve 14c. The override connection allows free flow of pilot water from the main valve control bonnet such that incoming flow from the upstream side of the main valve 14c through the restrictive orifice produces a control bonnet pressure that is insufficient to close the valve. The result is that flow through the main valve 14c becomes unregulated except for reverse flow, which closes the main valve as in check valve operation.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A control system for switching a variable speed motor drive among one of a plurality of pumps wherein each of the pumps is operable at a substantially constant speed to provide a predetermined output pressure established by a respective local feedback loop coupled to each pump, the control system comprising:

a control unit;

a first plurality of switching elements wherein members of said first plurality of said switching elements are coupled to said control unit and are couplable to a respective member of the plurality of pumps for providing electrical energy to cause each said respective pump to function at a substantially constant speed;

a second plurality of switching elements wherein members of said second plurality of switching elements are coupled to said control unit, are couplable to the variable speed drive and are couplable to a respective one of the pumps; and a plurality of feedback loop disabling control devices, wherein members of said plurality of feedback loop disabling control devices are coupled to said control unit and are couplable to respective members of the plurality of feedback loops coupled to each pump and wherein said control unit includes circuitry for selecting a pump from the plurality of pumps, said circuitry enabling a respective one of said control devices to disable the feedback loop of the selected pump, and circuitry for coupling the variable speed drive to the selected pump, via selected members of said second plurality of switching elements, causing the selected pump to function at a variable speed while the remaining members of the plurality of pumps are capable of functioning at a substantially constant speed.

2. A control system as in claim 1 wherein said control unit includes circuitry for actuating at least some of said members of said second plurality of switching elements to couple the variable speed drive to another pump.

3. A control system as in claim 1 wherein at least some of said control devices each include an electrically actuatable valve coupled to said control unit.

4. A control system as in clam 1 wherein said control unit includes digital processing circuitry.

5. A control system as in claim 1 wherein said control unit includes a graphical display output device.

6. A control system as in claim 1 wherein at least one of said switching elements of said first and second plurality of switching elements includes solid state AC switches.

7. A control system as in claim 1 wherein at least some of the pumps include temperature sensors.

8. A control system as in claim 7 wherein said temperature sensors are associated with electrically actuated valves operable to drain or recirculate fluid from the respective pump.

9. A control system as in claim 1 wherein the pumps have associated therewith pressure relief elements.

10. A method of operating a plurality of pumps so as to maintain a selected substantially constant output pressure in a fluid delivery system, the method comprising:

providing a plurality of pumps operable at a substantially constant speed and selectively operable at a variable speed;

providing a variable speed drive;

providing a control unit having a first plurality of switching elements electrically coupled thereto and couplable to at least one of a respective member of the plurality of pumps, said control unit having a second plurality of switching elements electrically coupled thereto, said second plurality of switching elements being couplable to said variable speed drive and couplable to a respective one of the plurality of pumps;

selecting one of the pumps for variable speed operation by coupling said variable speed drive to the selected pump;

sensing output pressure and in response to detecting a variation from the selected pressure, energizing the selected pump for variable speed operation so as to minimize the variation; and energizing another pump for constant speed operation in the event that the selected pump is incapable of minimizing the variation and adjusting the speed of the selected pump in accordance therewith.

11. A method as in claim 10 which includes:

energizing another pump for constant speed operation, in response to detecting the variation.

12. A method as in claim 10 wherein another pump is selected for variable speed operation instead of the one pump.

13. A method as in claim 10 which includes displaying visual information pertaining to operational status of the pumps.

14. A method as in claim 10 wherein an operator can establish a pump selection criterion.

* * * * *